(12) United States Patent
Dai et al.

(10) Patent No.: US 12,542,142 B2
(45) Date of Patent: *Feb. 3, 2026

(54) SYSTEM AND METHOD FOR ENHANCEMENT OF A DEGRADED AUDIO SIGNAL

(71) Applicant: Dolby Laboratories Licensing Corporation, San Francisco, CA (US)

(72) Inventors: Jia Dai, Beijing (CN); Kai Li, Beijing (CN); Richard J. Cartwright, Killara (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,555

(22) Filed: May 24, 2024

(65) Prior Publication Data

US 2024/0395267 A1 Nov. 28, 2024

Related U.S. Application Data

(63) Continuation of application No. 17/632,220, filed as application No. PCT/US2020/044324 on Jul. 30, 2020, now Pat. No. 11,996,108.

(Continued)

(30) Foreign Application Priority Data

Aug. 1, 2019 (WO) ................. PCT/CN2019/098896
Nov. 27, 2019 (EP) ..................................... 19211731

(51) Int. Cl.
*G06N 20/00* (2019.01)
*G10L 19/005* (2013.01)
(Continued)

(52) U.S. Cl.
CPC .......... *G10L 19/0208* (2013.01); *G06N 20/00* (2019.01); *G10L 19/005* (2013.01);
(Continued)

(58) Field of Classification Search
CPC ... G10L 19/0208; G10L 19/005; G10L 25/18; G10L 25/21; G06N 20/00; H04M 3/568
(Continued)

(56) References Cited

U.S. PATENT DOCUMENTS 5,913,194 A * 6/1999 Karaali ................... G10L 13/02
  704/265
6,560,225 B1  5/2003 Czajkowski
(Continued)

FOREIGN PATENT DOCUMENTS

CN 105489224 A 4/2016
CN 109887494 A 6/2019
(Continued)

OTHER PUBLICATIONS

Hoth, Daniel F. "Room Noise Spectra at Subscribers' Telephone Locations" The Journal of the Acoustical Society of America, 499, published by the Acoustical Society of America, Apr. 1941, vol. 12.

*Primary Examiner* — George C Monikang

(57) ABSTRACT

The present disclosure relates to the field of audio enhancement, and in particular to methods, devices and software for supervised training of a machine learning model, MLM, the MLM trained to enhance a degraded audio signal by calculating gains to be applied to frequency bands of the degraded audio signal. The present disclosure further relates to methods, devices and software for use of such a trained MLM.

17 Claims, 5 Drawing Sheets

Related U.S. Application Data

(60) Provisional application No. 62/889,748, filed on Aug. 21, 2019.

(51) Int. Cl.
*G10L 19/02* (2013.01)
*G10L 25/18* (2013.01)
*G10L 25/21* (2013.01)
*H04M 3/56* (2006.01)

(52) U.S. Cl.
CPC .............. *G10L 25/18* (2013.01); *G10L 25/21* (2013.01); *H04M 3/568* (2013.01)

(58) Field of Classification Search
USPC .................. 704/225, 226, 231–233, 246
See application file for complete search history.

(56) References Cited

U.S. PATENT DOCUMENTS

| | | |
|---|---|---|
| 7,289,626 B2 | 10/2007 | Carter |
| 7,362,811 B2 | 4/2008 | Dunne |
| 7,546,125 B2 | 6/2009 | Sharma |
| 8,189,477 B2 | 5/2012 | Henry |
| 8,407,049 B2 | 3/2013 | Cromack |
| 9,860,709 B2 | 1/2018 | Addepalli |
| 2016/0111107 A1 | 4/2016 | Erdogan |
| 2019/0122685 A1* | 4/2019 | Defraene ................. G06N 3/08 |
| 2019/0362711 A1 | 11/2019 | Nosrati |

FOREIGN PATENT DOCUMENTS

| | | |
|---|---|---|
| CN | 110085249 B | 3/2021 |
| WO | 2014009657 A1 | 1/2014 |
| WO | 2019105238 A1 | 6/2019 |

\* cited by examiner

SYSTEM AND METHOD FOR ENHANCEMENT OF A DEGRADED AUDIO SIGNAL

CROSS-REFERENCE TO RELATED APPLICATIONS

This application is a continuation of U.S. patent application Ser. No. 17/632,220, filed on Feb. 1, 2022, now U.S. Pat. No. 11,996,108, which is a U.S. National Stage application under U.S.C. 371 of International Application No. PCT/US2020/044324, filed Jul. 30, 2020, which claims priority to International Application No. PCT/CN2019/098896, filed Aug. 1, 2019, U.S. Provisional Patent Application No. 62/889,748, filed Aug. 21, 2019, and European Patent Application No. 19211731.5, filed Nov. 27, 2019, each of which is hereby incorporated by reference in its entirety.

TECHNICAL FIELD

The present disclosure relates to the field of audio enhancement, and in particular to methods, devices and software for supervised training of a machine learning model, MLM, the MLM trained to enhance a degraded audio signal by calculating gains to be applied to frequency bands of the degraded audio signal. The present disclosure further relates to methods, devices and software for use of such a trained MLM.

BACKGROUND

An audio signal may be submitted to a variety of compression, transcoding and processing steps before being listened to. This may result in a reduced listening experience for a user, where the audio quality of the played audio signal is not satisfactory. For example, a telephone conference service provider may find that there are significant degradations of audio quality before the audio signal is received by the telephone conference service. For example, a mobile phone conversation may often have GSM encoded voice which is transcoded to G.711 before being received by the telephone conference service provider.

The audio signal may thus be referred to as a degraded audio signal and enhancement of such a signal may advantageously be performed to reduce codec artefacts and improve the listening experience.

There are three main challenges for enhancing a degraded audio signal discussed herein. The first difficulty is that various encoding/trans-coding may be applied to an audio signal before being received to be enhanced, which often are unknown for the enhancement system. Consequently, an algorithm used for enhancement is expected to handle various codec chains. Another problem is that besides distortion resulting from the encoding/transcoding, there is typically noise and reverberation in the degraded audio signal. The third difficulty is that, since the algorithm may be implemented at the endpoints, and/or be required to handle enhancement in real time, the complexity of the algorithm may be an issue and is advantageously kept low.

There is thus a need for improvements in this context.

SUMMARY OF THE INVENTION

In view of the above, it is thus an object of the present invention to overcome or mitigate at least some of the problems discussed above. In particular, it is an object of the present disclosure to provide a low-complexity method for enhancing a degraded audio signal, wherein the method is robust for the cause of the distortion in the degraded audio signal. Further and/or alternative objects of the present invention will be clear for a reader of this disclosure.

According to a first aspect of the invention, there is provided a method for supervised training of a machine learning model, MLM, the MLM trained to enhance a degraded audio signal by calculating gains to be applied to frequency bands of the degraded audio signal. The method comprises the steps of:

receiving a degraded audio signal and a clean audio signal for training of the MLM;

extracting a first set of features from the received degraded audio signal, and a second set of features from the received clean audio signal, each feature corresponding to a frequency band of the respective received audio signals;

comparing each feature of the first set of features to a corresponding feature of the second set of features to derive a set of gains, each gain corresponding to a respective feature among the first set of features, and used as ground truth when training the MLM;

using the first set of features and the derived set of gains as a training set for training the MLM.

In the present method, over suppression in the trained MLM is reduced by at least one of:

a pre-processing step performed prior to deriving the set of gains, wherein the pre-processing step comprises adjusting the frequency energy distribution of the first and/or the second set of features such that the frequency energy distribution of the first set of features is substantially equal to the frequency energy distribution of the second set of features, and defining a loss function of the MLM which is configured to punish a predicted gain being lower than the ground truth gain more than a predicted gain being higher than the ground truth gain.

By the term "over suppression" should, in the context of present specification, be understood that when enhancing the degraded audio signal (e.g. reducing transcoding artifacts or removing noise etc.), some frequency bands of the degraded audio signal may be attenuated rather than amplified or attenuated to a higher degree than what is required. This should advantageously be avoided to improve the listening experience of the enhanced audio signal.

By the term "clean audio signal" should, in the context of present specification, be understood an audio signal without or with little defects that degrades the audio quality. The clean audio signal may be recorded using a high-end studio, or otherwise recorded to have a high quality.

By the term "degraded audio signal" should, in the context of present specification, be understood an audio signal having artefacts such as coding artefacts (due to e.g. compression), noise, reverberations, etc., that negatively influences the audio quality.

The inventors have realized that the different causes for a degraded audio quality result in that a traditional signal processing method may not be suitable for modelling the degradation. In order to make the algorithm for enhancement of the degraded audio signal robust to different causes of distortion and improve the perceptual quality, a machine learning model, MLM, is implemented and trained as defined herein. The MLM is trained by receiving a clean audio signal (with no/little distortion), and a corresponding degraded audio signal (having distortion). From these audio signals, a first set of features is extracted from the received degraded audio signal, and a second set of features is extracted from the received clean audio signal. Each feature corresponds to a frequency band of the respective received audio signals. Gains for the plurality of frequency bands are derived by comparing each feature of the first set of features to a corresponding feature of the second set. The first set of features and the gains are input to the MLM, and used for training the MLM.

The gains are thus used for reference, or as ground truth. Advantageously, by using the first set of features and the set of gains as input/output when training the MLM, instead of using Pulse code modulation, PCM, values of the degraded audio signal and the clean audio signal as input/output, the risk for unexpected errors in the enhancement process is reduced. Using gains and the first set of features as described herein facilitates a robustly trained MLM.

Over suppression (in audio of one or more of the frequency bands) in the enhanced signal is avoided by implementing at least one of:

1) a pre-processing method to minimize the difference of frequency energy distribution of clean audio and the degraded audio e.g. to solve a timbre quality issue (over suppression in high/low frequency part) or other types of over suppression issues;
2) a loss function of the MLM with over suppression punishment, i.e. a loss function that punish over suppression more.

To this end, the method facilitates reduction of over suppression in the trained MLM by at least one of:
a pre-processing step performed prior to deriving the set of gains, wherein the pre-processing step comprises adjusting the frequency energy distribution of the first and/or the second set of features such that the frequency energy distribution of the first set of features is substantially equal to the frequency energy distribution of the second set of features, and
defining a loss function of the MLM that is configured to punish a predicted gain being lower than the ground truth gain more than a predicted gain being higher than the ground truth gain.

Frequency energy distribution of the clean audio signal and the degraded audio signal often differs. If the distribution differs, this may lead to over suppression. For example, if energy tends to decrease from low frequency to high frequency in the clean audio signal but for the degraded audio signal, frequency energy distribution is more balanced (not decreasing as much as the clean audio signal), this may lead to over suppression in high frequencies. By employing the pre-processing step described herein, such over suppression may be avoided.

Using an MLM, which may be inherently difficult to control and manage in detail, the training may result in over suppression. To avoid this, a loss function may be defined that specifically is configured to punish a predicted gain being lower than the ground truth gain more than a predicted gain being higher than the ground truth gain.

According to some embodiments, over suppression is reduced using only one of the pre-processing step and the defined loss function of the MLM. In other embodiments, both the pre-processing step and the defined loss function of the MLM is employed. An advantage of the present method is the flexibility and that over suppression can be handled differently depending on the context and e.g. the available computational resources, available training data etc.

According to some embodiments, the loss function is further weighted according to the frequency band of the features of the training set, such that an error for a feature corresponding to a relatively higher frequency band is weighted with a relatively higher weight. Distortion due to codecs may be more likely to happen in high frequencies, which may make it more important to avoid over suppression in such frequency bands. For example, an error for a feature corresponding to a frequency band exceeding 6 kHz is weighted with a higher weight compared to an error for a feature corresponding to a frequency band below 6 kHz. Other threshold frequencies may be employed depending on the context. In some embodiments, errors for features corresponding to frequency band(s) between two threshold frequencies, or above or below a threshold frequency are weighted with a relatively higher weight, based on a perceptual importance according to a psychoacoustic model.

According to some embodiments, the first and second sets of features are extracted by converting the received degraded audio signal and clean audio signal into the frequency domain. For example, the conversion may be performed using one from the list of: a short time Fourier transform, SFTF, a modified discrete cosine transform, MDCT, and a shifted discrete frequency transform, MDXT.

To reduce the computational complexity, and/or to improve quality, the complex features resulting from the conversion to the frequency band (e.g. DCT components) may be banded (combined within a frequency band). To this end, the first and second set of features may be extracted by, for each frequency band of a plurality of frequency bands, for frequency bins of the frequency band, combining complex features of the frequency domain representation of the respective audio signal corresponding to the frequency bins into a single feature corresponding to that frequency band.

In some embodiments, the features of the first and second set of features corresponds to Mel-frequency band powers, Bark Scale band powers, log-frequency band powers or ERB band powers.

Put differently, according to some embodiments, the first and second sets of features are extracted by:
converting the received degraded audio signal and clean audio signal into the frequency domain,
for each frequency band, j, of a plurality of frequency bands
combining frequency components of the frequency domain representation of the degraded audio signal into a feature, $f_{1,j}$, corresponding to the frequency band, and adding $\log(f_{1,j})$ to the first set of features;
combining frequency components of the frequency domain representation of the clean audio signal into a feature, $f_{2,j}$, corresponding to the frequency band and adding $\log(f_{2,j})$ to the to the second set of features.

In some embodiments, the steps of combining frequency components of the frequency domain representation of the degraded audio signal into a feature, f1,j, comprises weighting the frequency components with different weights.

According to some embodiments, the plurality of frequency bands are equally spaced in Mel frequency. Consequently, the extracted features may advantageously approximating the human auditory system's response more closely than if a linearly-spaced frequency bands are used.

According to some embodiments, the first and second set of features are extracted by combining extracted features from a plurality of audio frames of the respective audio signals. Advantageously, the MLM may get more input data to work with.

According to some embodiments, the extracted first and second set of features are further normalized prior to being used for deriving the set of gains. Advantageously, the trained MLM may be less sensitive to differences in speech level and equalisation that arise from different microphones in different acoustic scenarios.

According to some embodiments, the step of pre-processing comprises balancing a frequency energy distribution of the second set of features to be substantially equally distributed across the entire frequency band of the received clean audio signal. In some embodiments, in particular in the context of audio conference services, frequency energy distribution of a degraded audio signal may be more balanced or not decrease as much as a clean audio signal typically does. Consequently, the frequency energy distribution of the second set of features may be balanced to avoid over suppression. Balancing the frequency energy distribution may be less computationally complex compared to adjusting the frequency energy distribution of the first set of features to be more similar to the frequency energy shape of the clean audio signal.

According to some embodiments, the pre-processing comprises: fitting a polynomial curve to the second set of features, defining a filter based on a difference between the polynomial curve and a constant function, and applying the filter to the second set of features. Advantageously, this is a low complexity embodiment for adjusting the frequency energy distribution such that the frequency energy distribution of the first set of features is substantially equal to the frequency energy distribution of the second set of features.

According to some embodiments, adjustment of the frequency energy distribution of the second set of features is only done if the shape of the frequency energy distribution of the second set of features fulfils certain requirements. Consequently, unnecessary adjustments are avoided, and computational resources may be saved. To this end, in these embodiments, the pre-processing comprises:
fitting a polynomial curve to the second set of features,
calculating a difference between a minimum value and a maximum value of the polynomial curve,
upon determining that the difference exceeds a threshold value: defining a filter based on the difference between the polynomial curve and a constant function and applying the filter to the second set of features. The threshold value may correspond to a 3 dB difference in a frequency energy distribution of the second set of features across the entire frequency band of the received clean audio signal.

According to some embodiments, the value of the constant function is set to the maximum value of the polynomial curve. In other embodiments, the mean value is chosen.

According to some embodiments, the polynomial curve is one from the list of: a linear curve, a quadratic curve and a cubic curve.

In some embodiments, the loss function of the MLM is used to avoid over suppression. Accordingly, in some embodiments the loss function is configured to punish a predicted gain being lower than the ground truth gain more than a predicted gain being higher than the ground truth gain by multiplying a distance measurement between the predicted gain and the ground truth with a weight, the weight being relatively higher when:
the predicted gain is lower than the ground truth gain, and
the predicted gain is negative,
the weight being relatively lower when the predicted gain is higher than or equal to the ground truth gain, or the predicted gain is positive.

In some embodiments, the ratio between the relatively higher weight and the relatively lower weight is between 3-7. In some embodiments, the ratio between the relatively higher weight and the relatively lower weight is 5.

To further improve the robustness of the training of the MLM, according to some embodiments, the method further comprises adding artificial pairs of features to the first and second sets of features, wherein an artificial pair of features comprises a first feature added to the first set of features and a second feature added to the second set of features, the first and second features having a same value and corresponding to a same frequency band.

To further improve the robustness of the training of the MLM, according to some embodiments, noise is added to the first set of features. The noise may be added only for a first threshold number of epochs when training the MLM. Consequently, a same pair of a degraded audio signal and a corresponding clean audio signal may result in slightly different gains for a same frequency band throughout the training of the MLM, to facilitate a robust MLM, with a reduced number of audio signals used for training.

According to some embodiments, the received degraded audio signal is generated from the received clean audio signal. Consequently, a same clean audio signal may be used for producing a plurality of degraded audio signals, simulating different transcoding chains. A reduced number of clean audio signals may thus be required to train the MLM.

According to some embodiments, generation of the degraded audio signal comprises applying at least one codec to the clean audio signal.

According to some embodiments, the at least one codec comprises a voice codec. An MLM trained for a teleconferencing system may thus advantageously be trained.

According to some embodiments, the method further comprising the step of, before comparing each feature of the first set of features to a corresponding feature of the second set of features to derive a set of gains, adjusting the first and/or the second set of features, wherein the adjustment comprises using distinct adjustment parameters during each training pass, epoch and/or minibatch of a training loop of the MLM. Advantageously, robustness of the trained MLM may be increased, and overfitting problems of the training process of the MLM may be avoided or reduced.

According to some embodiments, the adjustment parameters are drawn from a plurality of probability distributions. Advantageously, the robustness may be further increased.

According to some embodiments, the adjusting of the first set of features comprises at least one from the list of: adding fixed spectrum stationary noise, adding variable spectrum stationary noise, adding reverberation, adding non-stationary noise, adding simulated echo residuals, simulating microphone equalization, simulating microphone cutoff, and varying broadband level.

According to some embodiments, generation of the degraded audio signal comprises applying an Intermediate Reference System, IRS, filter to the clean audio signal.

According to some embodiments, generation of the degraded audio signal comprises applying a low pass filter to the clean audio signal.

According to some embodiments, generation of the degraded audio signal comprises convolving a generated degraded audio signal with a narrow band impulse response. Reverbation in the degraded audio signal may thus advantageously be simulated.

According to some embodiments, the MLM is one from a list of: an artificial neural network, ANN, a decision tree, a support vector machine, a mixture model, and a Bayesian network. The ANN may be a deep neural network, DNN, a shallow neural network, a convolutional neural network, CNN, etc., The mixture model may be a Gaussian Mixture model. The Bayesian network may be a Hidden Markov Model, HMM.

In a second aspect of the invention, there is provided a device configured for supervised training of a machine learning model, MLM, the MLM being trained to reduce codec artefacts in a degraded audio signal by calculating gains to be applied to frequency bands of the degraded audio signal, the device comprising circuitry configured to perform the method according to any embodiments of the first aspect.

In a third aspect of the invention, there is provided a computer program product comprising a non-transitory computer-readable storage medium with instructions adapted to carry out the method of the first aspect when executed by a device having processing capability.

The second and third aspect may generally have the same features and advantages as the first aspect.

According to a fourth aspect of the invention, there is provided a method for enhancing a degraded audio signal, comprising the steps of:
  receiving a degraded audio signal;
  extracting a first set of features from the received degraded audio signal;
  inputting the extracted first set of features to a machine learning model, MLM, trained according to any embodiments of the first aspect; and
  using output gains from the MLM for enhancing the received degraded audio signal.

The enhancement may comprise reducing coding artefacts of the received degraded audio signal.

The first set of features is advantageously extracted in a same way as the extraction of features from the degraded audio signal used in the training of the MLM, excluding any adding of noise.

According to some embodiments, the method further comprises the step of post-processing the output gains before using the gains for reducing coding artefacts of the received degraded audio signal. The post-processing may advantageously facilitate the output gains being in a reasonable range.

For example, the post-processing comprises at least one of:
  limiting a range of the output gains to a predefined range;
  limiting a difference between a gain for a frequency band of an audio frame of the received degraded audio signal and a gain for the frequency band of a previous audio frame of the received degraded audio signal,
  limiting a difference between a gain for a frequency band of an audio frame of the received degraded audio signal and a gain for a neighbouring frequency band of the audio frame or another audio frame of the received degraded audio signal.

According to some embodiments, the degraded audio signal is a public switched telephone network, PSTN, call, wherein the steps of extracting a first set of features and inputting the extracted first set of features to the trained MLM is performed for at least one audio frame of the PSTN call. According to some embodiments, each audio frame is used for producing gains. According to some embodiments, every N:th audio frame is used for producing gains. In these embodiments, the intermediate frames are enhanced using the gains from a previous audio frame for which the gains have been determined.

The device may enhance the degraded audio signal in real time, i.e. the degraded audio signal may be streamed to the device. In other embodiments, the device enhances a recorded audio signal received by the device.

According to some embodiments, the method is implemented in an end point of an audio conference system for enhancing incoming audio signals.

According to some embodiments, the method is implemented in a server of an audio conference system for enhancing incoming audio signals before being transmitted to an end point.

In a fifth aspect of the invention, there is provided a device configured for enhancing a degraded audio signal, the device comprising circuitry configure to perform the method according to any embodiments of the fourth aspect.

In a sixth aspect of the invention, there is provided a computer program product comprising a non-transitory computer-readable storage medium with instructions adapted to carry out the method of the fourth aspect when executed by a device having processing capability.

It is further noted that the invention relates to all possible combinations of features unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which embodiments of the invention are shown. The systems and devices disclosed herein will be described during operation.

The present disclosure generally relates to the problem of enhancing an audio signal. As described above, a quality of an audio signal may be degraded, due to e.g. artefacts caused by encoding and/or transcoding of the audio signal, and due to noise added to the audio signal during recording and/or transmission of the audio signal. In the following, the degraded audio signal is sometimes exemplified as a public switched telephone network, PSTN, call. However, this is just by way of example and the methods and systems described herein may be employed for enhancing the quality of any other suitable type of audio signals, such as for example a voice over IP signal (VoIP), audio in streaming media, or an analogue or digital recording of audio.

As described herein, the enhancing of the degraded audio signal is facilitated by training a machine learning model, MLM. The MLM may be embodied by a one from the list of: an artificial neural network, ANN, a decision tree, a support vector machine, SVM, a mixture model, and a Bayesian network. The ANN may be a Deep Neural network, DNN, a Convolutional Neural network, CNN, a shallow neural network or any other suitable type of ANN. In the following, a DNN is used by way of example when describing the invention.

Figure 1:
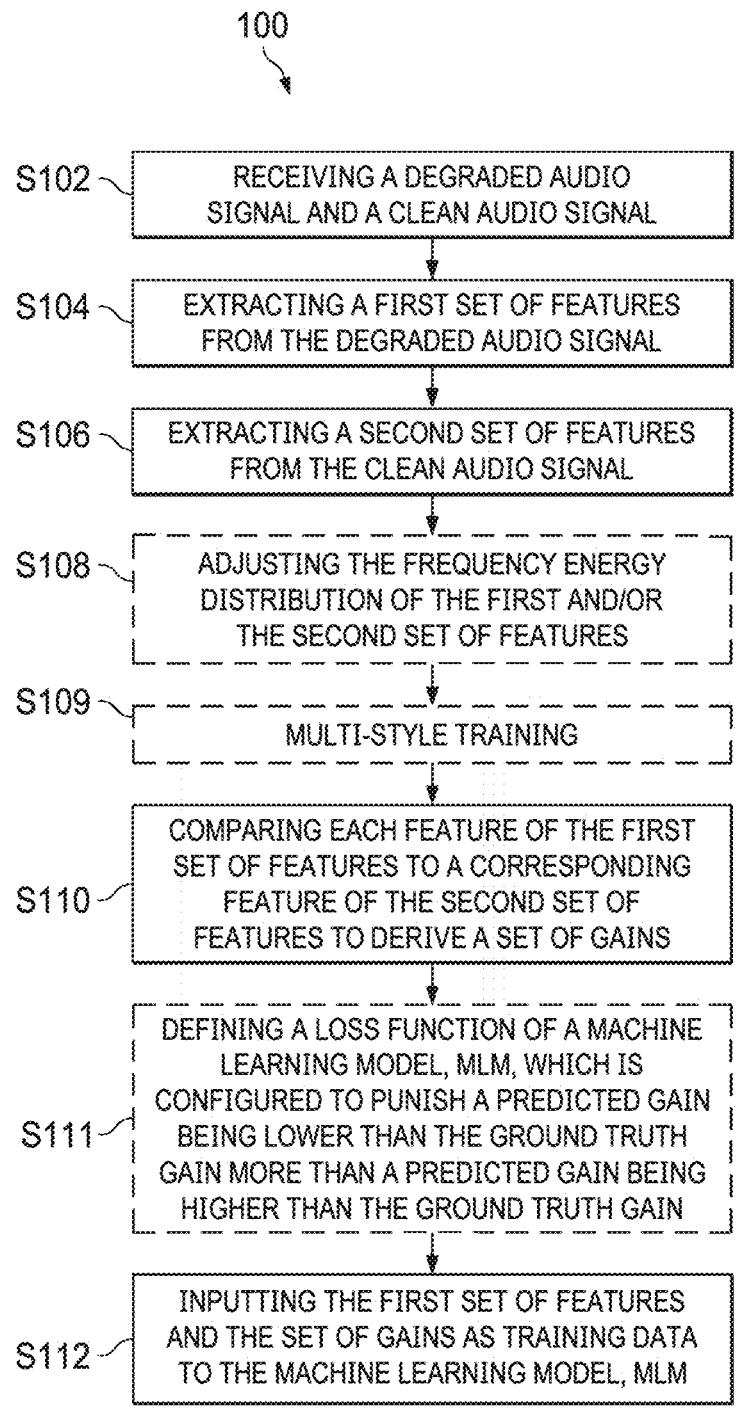
FIG. 1 shows a method for supervised training of a machine learning model, MLM, according to some embodiments.

FIG. 1 shows by way of example a method 100 for supervised training of a machine learning model, MLM, to enhance a degraded audio signal by calculating gains to be applied to frequency bands of the degraded audio signal. Different embodiments of the method will now be described in conjunction with FIGS. 2 and 3.

The method 100 comprises receiving a degraded audio signal 308 and a clean audio signal 310 for training of the MLM. The degraded audio signal 308 and a clean audio signal 310 is thus received by a device 301 configured for training an MLM to enhance a degraded audio signal by calculating gains to be applied to frequency bands of the degraded audio signal. The device 301 comprises circuitry, for example in the form of one or more processors, configured to receive the degraded audio signal 308 and the clean audio signal 310.

In one embodiment, the degraded audio signal 308 is generated from the clean audio signal 310 in a degraded audio creator unit 312. The degraded audio creator unit 312 may be part of a same device 300 as the enhancing device 301, or may be a device separate from the enhancing device 301 and wired or wirelessly connected to the enhancing device 301. The degraded audio creator may be implemented using one or more processors. The functionality of the degraded audio creator unit 312 will now be described.

The degraded audio creator unit 312 may be seen as embodying a plurality of simulated transcoding chains. The degraded audio creator unit 312 receives a clean audio signal 310 and outputs one or more degraded audio signals 308. Advantageously, one clean audio signal may result in a plurality of clean-degraded audio signal pairs, where the input clean audio signal 310 is part of each pair, and where the degraded audio signal 308 in each pair comprises different types of artefacts.

Each simulated transcoding chain in the degraded audio creator unit 312 contains a series of codecs and filters. For example, the generation of the degraded audio signal may comprise applying at least one codec (e.g. a voice codec) to the clean audio signal. The generation of the degraded audio signal may alternatively or additionally comprise applying an Intermediate Reference System, IRS, filter to the clean audio signal. The generation of the degraded audio signal may alternatively or additionally comprise applying a low pass filter to the clean audio signal.

Below follow 11 examples of transcoding chains which have been proved advantageous for training an MLM as described herein. The details of the 11 transcoding chains are:

(1) Clean audio signal→Low pass filter & IRS8→AMR-NB (5.1)→G.711→VSV→degraded audio signal,
(2) Clean audio signal→Low pass filter & IRS8→AMR-NB (12.20)→G.711→degraded audio signal,
(3) Clean audio signal→Low pass filter & IRS8→G.729→G.729 (delayed by 12 samples)→G.711→VSV→degraded audio signal,
(4) Clean audio signal→Low pass filter & IRS8→dynamic range compression→Opus Narrowband (6 Kbps)→G.711→VSV→degraded audio signal,
(5) Clean audio signal→Low pass filter & IRS8→Opus Narrowband (6 kbps)→AMR-NB (6.70)→G.711→VSV→degraded audio signal,
(6) Clean audio signal→Low pass filter & IRS8→dynamic range compression→AMR-NB (6.70)→G.711→VSV→degraded audio signal,
(7) Clean audio signal→Low pass filter & IRS8→AMR-NB (5.1)→MNRU→G.711→VSV (MOS=3.0)→degraded audio signal,
(8) Clean audio signal→Low pass filter & IRS8→AMR-NB (5.1)→MNRU→G.711→VSV (MOS=2.5)→degraded audio signal
(9) Clean audio signal→Low pass filter & IRS8→CVSD→dynamic range compression→AMR-NB→G.711 (Simulating GSM mobile on Bluetooth)→VSV→degraded audio signal,
(10) Clean audio signal→Low pass filter & IRS8→iLBC→G.711 (simulating iLBC SIP truck)→VSV→degraded audio signal,
(11) Clean audio signal→Low pass filter & IRS8→speex→G.711 (simulating speex SIP truck)→VSV→degraded audio signal.

The degraded audio signals outputted from the 11 transcoding chains may further be convolved with a narrow band impulse response before being used for training the MLM to simulate reverberations.

The dynamic range compression may be performed by any suitable compressor, depending on the context and requirements. For example, the dynamic range may be used to mimic the compression in a PSTN transcoding chain.

Returning now to FIG. 1. After receiving the degraded 308 and clean 310 audio signal, the method 100 comprises extracting S104 a first set of features from the received degraded audio signal 308, and extracting S106 a second set of features from the received clean audio signal 310. Each feature of the first and second sets of features corresponds to a frequency band of the respective received audio signals 308, 310.

Embodiments of the feature extraction S104, S106 will now be described.

The received degraded audio signal 308 and clean audio signal 310 is converted into the frequency domain. The frequency domain refers to the analysis of the audio signals with respect to frequency, rather than time. Any suitable mathematical transforms (Fourier transform, Wavelet transform, etc.,) for the conversation may be employed. Advantageous examples comprise a short time Fourier transform, SFTF, a modified discrete cosine transform, MDCT, and a shifted discrete frequency transform, MDXT. A reason for using MDXT instead of MDCT or DFT is that it provides both the energy compaction property of the MDCT and the phase information similar to DFT.

The features of the first and second set of features are advantageously banded features, meaning that a feature corresponds to a frequency band rather than a frequency bin. This will reduce the complexity of the training of the MLM, since less input values will be used for training.

For this reason, according to some embodiments, the first and second set of features are extracted by, for each frequency band of a plurality of frequency bands, for frequency bins of the frequency band, combining complex features of the frequency domain representation of the respective audio signal corresponding to the frequency bins into a single feature corresponding to that frequency band. The combination of the complex features may comprise calculating an absolute value of the complex values of the bins. The logarithm of the combined value may then be added to the first/second set of features. In some embodiments, the features of the of the first and second set of features corresponds to Mel-frequency band powers, Bark Scale band powers, log-frequency band powers or ERB band powers.

Putting it differently, the first and second sets of features may be extracted by: converting the received degraded audio signal and clean audio signal into the frequency domain,
for each frequency band, j, of a plurality of frequency bands
combining (as described above) frequency components (i.e. corresponding to the bins of the frequency band j) of the frequency domain representation of the degraded audio signal into a feature, $f_{1,j}$, corresponding to the frequency band, and adding $\log(f_{1,j})$ to the first set of features;
combining (as described above) frequency components (i.e. corresponding to the bins of the frequency band j) of the frequency domain representation of the clean audio signal into a feature, $f_{2,j}$, corresponding to the frequency band and adding $\log(f_{2,j})$ to the to the second set of features.

In some embodiments, the combining of frequency components of the frequency domain representation of the degraded/clean audio signal into a feature comprises weighting the frequency components with different weights.

The frequency bands may be determined such that each comprise a same number of bins (such as 100, 160, 200, 320, etc., bins).

In one embodiment, the log of the power in of a number of spectral bands equally spaced in Mel frequency (hereinafter referred to as "logmelspec" values) is computed, for example every 10 ms. In one embodiment, for the most recent 5-20 frames of the audio signal (clean, degraded) is used and such features are "stacked up" into an extended 230-460 dimensional feature vector (first and second set of features). In other words, the first and second set of features are extracted by combining extracted features from a plurality of audio frames of the respective audio signals.

A method for normalisation of "logmelspec" features that are "stacked up" over multiple analysis frames will now be described. It should be noted that this normalization scheme is entirely optional to include in the method for supervised training of a machine learning model, MLM, as described herein. In summary, the optional normalisation technique:
1) only normalizing among the features in the stack (e.g. over a 100-200 ms time window of the audio signal). This means it is helpful in accurately recognizing speech or detecting specific words (in a speech recognizing system) even when a user suddenly begins speaking in never-before-heard acoustic conditions.
2) separates macro-scale spectral shape from micro-scale detail. This is helpful in creating systems which are robust to, for example, microphone with different equalization curves or room impulse responses (RIRs) with different spectral shape. It also means the system is more robust to background noise.
3) accommodates weighting (certainty) in the features. This means the system can take additional input from pre-processing systems such as echo suppressors, noise suppressors and non-linear beamforming systems which greatly aid in robustness.

The normalization scheme comprises the following equations.

$$\mu[f] = \frac{1}{T}\sum_{t=1}^{T} x[f,t] \quad \quad 200$$

$$L = \frac{1}{F}\sum_{f=1}^{F} \mu[f] \quad \quad 201$$

$$\overline{\mu}[f] = \mu[f] - L \quad \quad 202$$

$$c[b] = \sum_{f=1}^{F} C[b,f]\,\overline{\mu}[f] \quad \quad 203$$

$$s[f] = \sum_{b=1}^{B} S[f,b]\, c[b] \quad \quad 204$$

$$y[f,t] = x[f,t] - L - s[f] \quad \quad 205$$

where $$C_1[b+1, f] = \cos\left(\frac{b\pi(f-1)}{F}\right) \quad \quad 206$$

for $b = 1 \ldots B, f = 1 \ldots F$ $$C[b,f] = \frac{C_1[b,f]}{\sum_{f'}(C_1[b,f'])^2} \quad \quad 207$$

$$S = C^+ \quad \quad 208$$

+ Denotes Moore-Penrose pseudoinverse

Notes:
Equation 200: In this step, the mean spectrum over all frames in the stack is computed.
Equation 201: In this step, the mean level over all frames in the input stack 108 is computed (in this example by taking the mean of the spectrum over all frequencies).
Equation 202: In this step, the mean level-independent spectrum is computed.
Equation 203: In this step, a smooth cepstral approximation of the mean level-independent spectrum is computed for a small number of cepstral dnabs. The cepstral components except for the one corresponding to the flat basis function (usually, this means excluding the first cepstral component) are taken as a set of cepstral output components 110B which summarise the general spectral shape of the audio data in the stack in a format that is convenient for a speech recogniser to use.
Equation 204: In this step, the smooth cepstral approximation is transformed back into a smooth spectrum.
Equation 205: In this step, the normalised spectral output is computed by removing the smoothed mean spectrum from the input.
$x[f,t]$ is an unnormalized input feature at a particular time t (in the range [1,T], index 1 corresponding to the most recent data) in the past and a particular frequency band f (in the range [1,F]).
$\mu$ is the mean spectrum averaged over all frames [1,T]
L is mean broadband level.
$\overline{\mu}$ is the mean level-independent spectrum averaged over all frames [1,T]
c[b] is a cepstral decomposition of $\overline{\mu}$ obtained by taking the truncated Discrete Cosine Transform (DCT) of $\overline{\mu}$ w.r.t. the DCT basis matrix C[b,f] for each of the cepstral dnabs b=[1 ... B] (a typical value for B is 3).

s[f] is the spectral resynthesis of c[b] obtained by taking the truncated Inverse Discrete Cosine Transform (IDCT) of c w.r.t. the IDCT basis matrix S[f,b]

y[f,t] are the normalised output features c[b] for b>1 (that is, excluding the first cepstral dnab) are the cepstral output features output from the normalisation scheme comprises y[f,t] for f in [1,F] and t in [1,T] as well as c[b] for b in [2,B].

The DCT basis C[b,f] is computed using the equations 206 and 207.

The IDCT basis S[f,b] is computed by taking the Moore-Penrose pseudoinverse of C[b,f].

In some embodiments, the mean across time (mu) and the mean across time and frequency (L) can both be taken as weighted means if a confidence weighting w[f,t] is available for each input feature x[f,t]. This provides added noise robustness. In this extension, equation 200 would be replaced with 200A and equation 201 would be replaced with equation 201A.

$$\mu[f] = \frac{\sum_{t=1}^{T} x[f, t]w[f, t]}{\sum_{t=1}^{T} w[f, t]} \quad 200A$$

$$L = \frac{\sum_{f=1}^{F} \sum_{t=1}^{T} x[f, t]w[f, t]}{\sum_{f=1}^{F} \sum_{t=1}^{T} w[f, t]} \quad 201A$$

The mean across time has be implemented as an IIR (recursive) mean instead of the FIR mean shown: μ[f,t]=αμ[f,t−1]+(1−α)×[f,t]. An example value of α is 0.96.

Note that in we use the term cepstrum to mean the discrete cosine transform of the logmelspec data. It is common to reverse the characters in part of the word in order to come up with a cepstral term that corresponds to a spectral term. For example, filtering implemented in the cepstral domain is commonly known as "liftering". Therefore, we herein term the cepstral equivalent of a spectral band a "dnab".

A system for implementing the above described normalization method may comprises a speaker speaking into a microphone. The audio signal recorded by the microphone is sent to an Analogue-to-digital converter. The pulse code modulated data (PCM data) may be sent to a digital pre-processing unit (may include echo suppression, noise suppression, beam-forming for example). The PCM data is then used for feature extraction as described above. For example, the log of power in 25 frequency bands of equal width in Mel-frequency space are computed, resulting in a feature vector (eg 25 real numbers) The features from one audio frame is then sent to a stacking unit, which has a history buffer and stores or "stacks up" multiple feature vectors into a 2 dimensional array of features in time and frequency. For example, for every 10 ms a new 25 band feature vector may be computed and the stacking unit keeps the most recent 10 such vectors so that its output is a 25 (in frequency) by 10 (in time) array of feature history. Subsequently, the normalization as described above in conjunction with equations 201-208 are performed. The normalization feature set comprising:

A two-dimensional "stack" of normalised features. This two-dimensional array will typically have the same size as the unnormalized feature stack.

A small number of cepstral features describing the overall average spectral shape in the feature stack. This would, for example, encompass 2 real numbers.

The normalization feature set will then be used for input (optionally pre-processed to adjust the frequency energy distribution as described herein) to the MLM, e.g. a Deep Neural Network (DNN), Convolutional Neural Network (CNN) or Recurrent Neural Network (RNN).

Returning again to FIG. 1. When the first and second sets of features have been extracted S104, S106, in some embodiments, pre-processing is applied to the sets of features. The pre-processing is adapted to adjust the frequency energy distribution of the first and/or the second set of features such that the frequency energy distribution of the first set of features is substantially equal to the frequency energy distribution of the second set of features. This is done to reduce over suppression of certain frequency bands when the trained MLM is used for enhancing a degraded audio signal. As described above, the coding/transcoding of the degraded audio signal may result in a timbre quality issue, where e.g. a high/low frequency bands of the degraded audio signal 308 have a substantially different frequency energy distribution compared to the clean audio signal 310. In other embodiments, other frequency bands other than the high or low frequency part may show similar problems. In other words, the frequency energy distribution of degraded audio signal 308 and clean audio signal 310 is different.

To mitigate this problem, the method 100 for training an MLM may comprise a pre-processing step S108 that adjusts the frequency energy distribution of the first and/or the second set of features such that the frequency energy distribution of the first set of features is substantially equal to the frequency energy distribution of the second set of features. The adjustment may be applied to the first set of features, or the second set of features, or the first and the second set of features. In the following, pre-processing of the second set of features is described by way of example.

Figure 2:
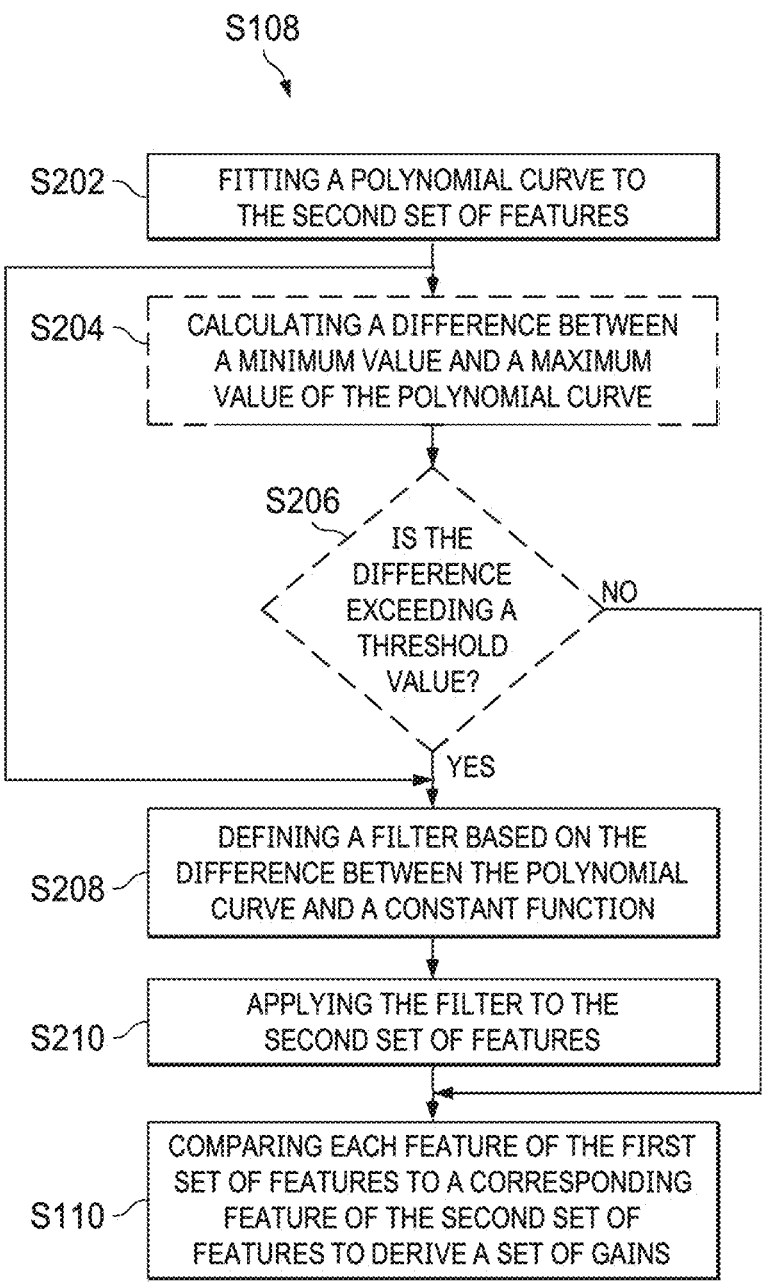
FIG. 2 shows a method for balancing a frequency energy distribution of a second set of features to be substantially equally distributed according to some embodiments.

In some embodiments, the pre-processing comprises balancing a frequency energy distribution of the second set of features to be substantially equally distributed across the entire frequency band of the received clean audio signal. This may be done, since for a clean audio signal 310, energy trends to decrease from low frequency to high frequency. But for degraded audio signal 308, frequency energy may be more balanced or not decrease as much as for the clean audio signal 310. That means that their frequency energy shape is different, and if the first and second set of features is used as is to train the MLM, this may lead to over suppression in high frequencies. Such an embodiment is shown in FIG. 2.

The balancing of the frequency energy distribution of the second set of features may comprise: fitting S202 a polynomial curve to the second set of features, defining S208 a filter based on difference between the polynomial curve and a constant function, and applying S210 the filter to the second set of features. The adjusted second set of features may then be used for calculating S110 the gains for training (which will be further described below).

In some embodiments, the frequency energy distribution of the second set of features is only balanced in case the original frequency energy shape fulfils some prerequisites. For example, a difference between a minimum value and a maximum value of the polynomial curve may need to exceed a threshold value such as 3 dB, 5 dB or any other suitable threshold. The threshold value may thus correspond to e.g. a 3 dB difference in a frequency energy distribution of the first set of features across the entire frequency band of the received clean audio signal 310. In these embodiments, the balancing of the frequency energy distribution of the second set of features may comprise: fitting S202 a polynomial curve to the second set of features, calculating S204 a difference between a minimum value and a maximum value of the polynomial curve, upon determining (in step S206) that the difference exceeds a threshold value: defining S208 a filter based on difference between the polynomial curve and a constant function, and applying S210 the filter to the second set of features. The adjusted second set of features may then be used for calculating S110 the gains for training (which will be further described below). In case the difference does not exceed the threshold (as determined in S206), the second set of features are used as is for calculating S110 the gains for training (which will be further described below).

The polynomial curve may be one from a list of: a linear curve, a quadratic curve and a cubic curve.

The value of the constant function may be set to the maximum value, minimum value or mean value of the polynomial curve.

It should be noted that in other embodiments, the first set of features may be adjusted to be more similar (in energy distribution) to the second set of features using similar processes as described above.

It should further be noted that in some embodiments, both the first and second set of features may be adjusted to meet a target energy distribution. Such target energy distribution may be based on e.g. a perpetual importance of the different frequency bands.

Returning again to FIG. 1. In some embodiment, multi-style training S109 of the MLM is employed. Training of an MLM is advantageously employed using a lot of data, and the data need to be various to make sure the trained MLM robust. Multi-style training is a method of data augmentation, which is used for making data diversification. This step S109 may comprise adding random noise to the first and/or second set of features (adjusted or not according to step S108) before used of calculating the gains. In some embodiments, the noise is added to the first set of features. The noise may have a limit of 5%, 10%, 20%, etc., of the value of the feature it is added to. In some embodiments, a same amount of noise is added to both a feature pair of the first and second set of features (i.e. one feature from the first set of features and a corresponding feature, relating to the same frequency band, of the second set of features), to simulate a change of energy level for the frequency band corresponding to the feature pair. In some embodiments, the noise is added only for a first threshold number of epochs when training the MLM.

In some embodiments, the multi style training comprises using distinct adjustment/augmentation parameters during each training epoch (e.g., each epoch, minibatch, and/or pass, of or in the training loop), and such embodiments will now be described in conjunction with FIG. 6. For example, such procedure efficiently adds different noise and reverb in the feature domain on each training pass/epoch. This may increases the ability of speech technology such as speech recognisers, wakeword detectors and noise suppressors to operate in real-world far-field conditions without many of the overfitting problems that traditionally plague multi-style training approaches.

Figure 6:
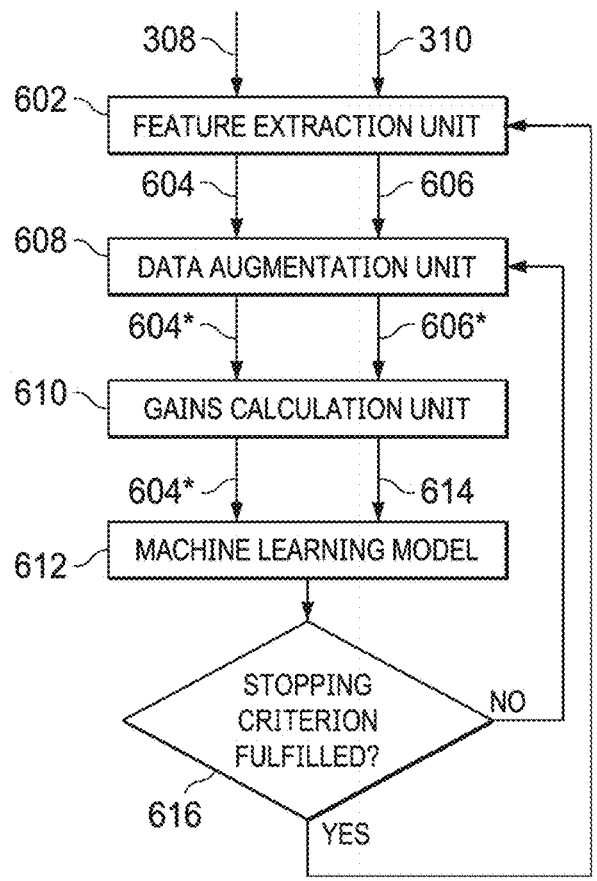
FIG. 6 shows a device for multi-style training of a machine learning model, MLM, according to some embodiments.

In FIG. 6, the degraded audio signal 308 and the clean audio signal 310 is received by a feature extraction unit 602. The feature extraction unit extracts a first set of features 604 from the degraded audio signal 308 and a second set of features from the clean audio signal 310 as described above.

It should be noted that, for simplicity, FIG. 6 does not include the optional feature of adjusting of the frequency energy distribution of the first and/or the second set of features, but such extension of the multi style training of FIG. 6 would mean that a pre-processing unit would receive the first 604 and second 606 set of features and perform the adjusting of the frequency energy distribution as described herein.

The first 604 and second 606 set of features are received by a data augmentation unit 608 that implements the multi-style training (S109 in FIG. 1). The data augmentation unit 608 takes the first 604 and second 606 set of features and adjusts a set of features 604, 606 by applying augmentation (e.g., addition of reverberation, addition of stationary noise, addition of non-stationary noise, and/or addition of simulated echo residuals) thereto, thus generating augmented set of features 604*, 606*. The data augmentation unit 608 may operate on both or one of the received sets of features 604, 606. It should be noted that the data augmentation unit 608 operates:

in the feature domain. For this reason, implementations may be fast and efficiently implemented on a GPU as part of a deep learning training procedure; and inside the pass/epoch loop of the training of the MLM 612, which means that different augmentation conditions (e.g., distinct room/reverberation models, distinct noise levels, distinct noise spectra, distinct patterns of non-stationary noise or music residuals) can be chosen on each training epoch of the MLM 612.

In case a stopping criterion 616 is not fulfilled (i.e. a defined number of epochs of training of the MLM 612 or a convergence criterion of the MLM 612), the data augmentation unit will again augment the sets of features 604, 606 and the MLM 612 will be trained based on new augmented set(s) of features 604*, 606*. In case the stopping criterion 616 is fulfilled, the feature extraction unit will operate on a next audio frame (if any) of the degraded audio signal 308 and the clean audio signal 310 to proceed with the training of the MLM.

Examples of types of augmentations (using adjustment parameters) that the data augmentation unit 608 may perform in the feature domain (on the first and/or second set of features 604, 606) include (but are not limited to) the following:

Fixed spectrum stationary noise: For each corresponding utterance in the clean and degraded audio signal 308, 310, draw a random signal to noise ratio (SNR) from a distribution (e.g., normal distribution with mean 45 dB, and standard deviation 10 dB) and apply stationary noise with a fixed spectrum (e.g., white noise, pink noise, Hoth noise) at the chosen level below the incoming speech signal. When the input features are band powers in dB, adding noise corresponds to taking the bandwise maximum of noise power and signal power. An example of fixed spectrum stationary noise augmentation will be described with reference to FIG. 7;

Variable spectrum stationary noise: Draw an SNR as for the fixed spectrum stationary noise addition, and also draw a random stationary noise spectrum from a distribution (for example, a distribution of linear slope values in dB/octave, a distribution over DCT values of the log mel spectrum (cepstral)). Apply noise at the chosen SNR with the chosen shape;

Non-stationary noise: Add noise that is localized to random locations in the spectrogram in time and/or in frequency. For example, for each training utterance, draw ten rectangles, each rectangle having a random start time and end time and a random start frequency band and end frequency band and a random SNR. Within each rectangle, add noise at the given SNR;

Reverberation: Draw a reverberation model (e.g., with a random RT60, mean free path and distance from source to microphone). Apply this reverberation model to the input features (e.g., as described in U.S. Provisional Patent Application No. 62/676,095);

Simulated echo residuals: To simulate leakage of music through an echo canceller (smart speakers, and some other smart audio devices and other devices, must routinely recognize speech incident at their microphones while music is playing from their speakers, and typically use an echo canceller or echo suppressor to partially remove echo), add music-like noise. An example of simulated echo residuals augmentation will be described with reference to the code listing below;

Microphone equalization: Speech recognition systems often need to operate without complete knowledge of the equalization characteristics of their microphone hardware. Therefore, it can be beneficial to apply a range of microphone equalization characteristics during training. For example, choose a random microphone tilt in dB/octave (e.g., from a normal distribution mean of 0 dB/octave, standard deviation of 1 db/octave) and apply a filter which has a response which has a linear magnitude response. When the feature domain is log (e.g., dB) band power, this may correspond to adding an offset to each band proportional to distance from some reference band in octaves. An example of microphone equalization augmentation will be described with reference to FIG. 8;

Microphone cutoff: Another microphone frequency response characteristic which is not necessarily known ahead of time is the low frequency cutoff. For example, one microphone may pick up signal down to 200 Hz, while another microphone may pick up speech down to 50 Hz. Therefore, augmenting the input features by applying a random low frequency cutoff (highpass) filter may improve performance across a range of microphones; and/or Level: A further parameter which may vary from microphone to microphone and from acoustic situation to acoustic situation is the level or bulk gain. For example, some microphones may be more sensitive to other microphones and some talkers may sit closer to a microphone than other talkers. Further some talkers may talk louder than other talkers. Speech recognition systems must therefore deal with speech at a range of input levels. It may therefore be beneficial to vary the level of the input features during training. When the features are band power in dB, this can be accomplished by drawing a random level offset from a distribution (e.g., uniform distribution over [−20, +20] dB) and adding that offset to all band powers.

The adjustment/augmentation parameters thus are derived using one or more of the above strategies. The adjustment/augmentation parameters may be drawn from one or more probability distributions.

Figure 7:
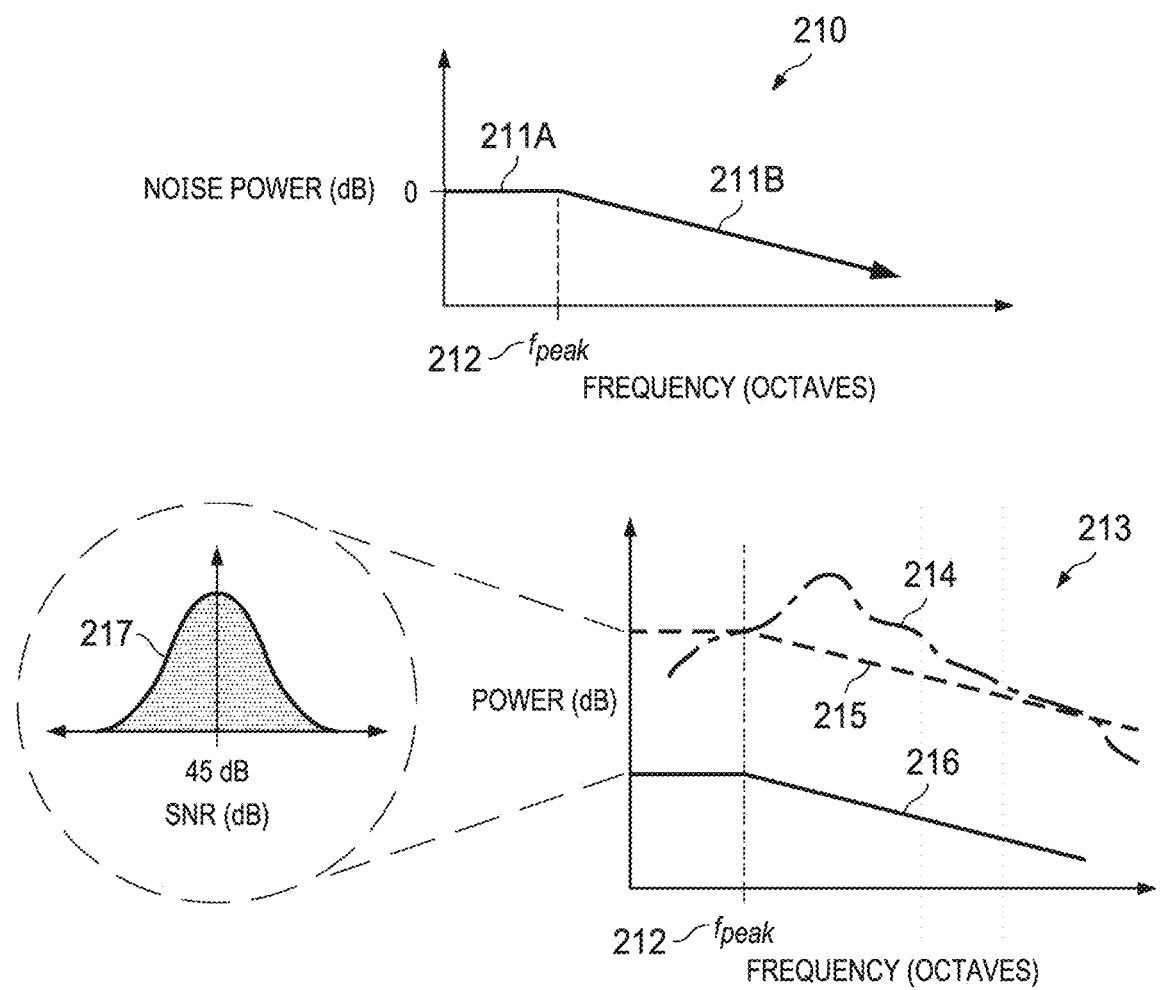
FIG. 7 is a diagram showing an example of fixed spectrum stationary noise addition (augmentation) according to some embodiments.

Another embodiment of the invention, which includes fixed spectrum stationary noise augmentation, will be described with reference to FIG. 7. FIG. 7 is a diagram showing an example of fixed spectrum stationary noise addition (augmentation) in accordance with an embodiment of the invention. Elements of FIG. 7 include the following:

210: example noise spectrum;

211A: flat portion of example spectrum 210. Spectrum 210 is flat below reference frequency $f_{peak}$. An example value of $f_{peak}$ is 200 Hz.;

211B: portion of example spectrum 210 above frequency $f_{peak}$. Portion 211B of spectrum 210 rolls off at a constant slope in dB/octave. According to experiments by Hoth (see Hoth, Daniel, The Journal of the Acoustical Society of America 12, 499 (1941); https://doi.org/10.1121/1.1916129), a typical mean value to represent such roll off of noise in real rooms is 5 dB/octave;

212: Reference frequency ($f_{peak}$) below which average spectrum is modelled as flat;

213: Example mean speech spectrum 214 and example equivalent noise spectrum 215;

214: Example mean speech spectrum over one training utterance;

215: Equivalent noise spectrum. This is formed by shifting the noise spectrum 210 by the equivalent noise power so that the mean power over all frequency bands of the equivalent noise spectrum 215 is equal to the mean power over all bands of the mean speech spectrum 214. The equivalent noise power can be computed using the following formula:

$$ENP = 10 \log_{10}\left(\frac{1}{N}\sum_{i=1}^{N} 10^{\frac{x_i - n_i}{10}}\right)$$

where $x_i$ is the mean speech spectrum in band i in decibels (dB), $n_i$ is the prototype noise spectrum in band i in decibels (dB), and There are N bands;

216: Added noise spectrum. This is the spectrum of the noise to be added to the training vector (in the feature domain). It is formed by shifting the equivalent noise spectrum 215 down by the Signal to Noise Ratio, which is drawn from the SNR distribution 217. Once created, the noise spectrum 216 is added to all frames of the training vector in the feature domain by taking the maximum of the signal band power and the noise spectrum in each time-frequency tile; and 217: Signal to Noise Ratio (SNR) distribution. An SNR is drawn, from the distribution 217, for each training vector in each epoch/pass. In the example, SNR distribution 217 is a normal distribution with a mean of 45 dB and a standard deviation of 10 dB.

Figure 8:
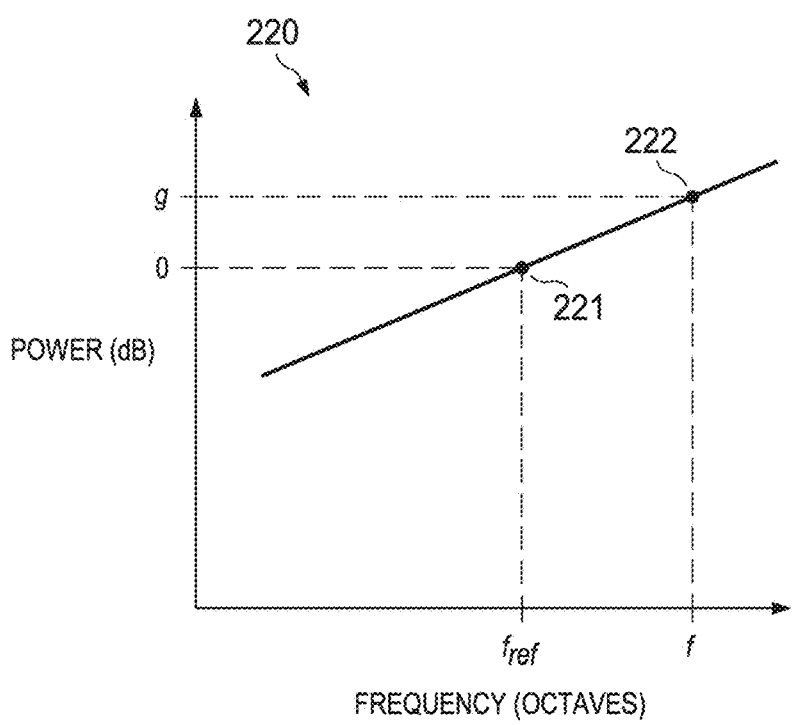
FIG. 8 is a diagram showing an example of microphone equalization augmentation according to some embodiments.

Another embodiment of the invention, which includes microphone equalization augmentation, will be described with reference to FIG. 8. Elements of FIG. 8 include the following:

220: Example microphone equalization spectrum (a curve, indicating power in dB as a function of frequency) to be added to all frames of one training vector for one epoch/pass of training. In this example the microphone equalization curve 220 is linear in dB/octaves;

221: Reference point (of curve 220). In the band corresponding to (i.e., including) a reference frequency $f_{ref}$ (e.g., $f_{ref}$=1 kHz), the power (indicated by equalization spectrum 220) is 0 dB; and 222: A point of curve 220, at an arbitrary frequency, f. At point 222, the microphone equalization curve 220 has gain, "g" dB, where g=T $\log_2(f-f_{ref})$ for a randomly selected tilt T in dB/octave. For example, T can be drawn for each training vector for each epoch/pass.

Below there is provided an example of simulated echo residuals augmentation with reference to the following code listing. The code listing (in Julia programming language) implements music residual addition. In this listing:

coef.fband is a vector of band centre frequencies in Hz; coef.meandifflog_fband is mean(diff(log.(fband))); and coef.dt_ms is the audio frame size in milliseconds.

The exemplary code listing is:

```
function batch_generate_residual(nframe::Int, nvector::Int,
coef::NoiseAdditionCoef{X, P}) where {X<:Real, P<:Real}
    nband = length(coef.fband)
    tempo_bpm = X(100) .+ rand(X, 1, 1, nvector)*X(80)
    pitchiness = (X(1) .+ rand(X, 1, 1, nvector).*X(10)) .* X(0.07)
./ coef.meandifflog_fband
    melody = randn(X, 1, 1, nvector) .* X(0.01) ./
coef.meandifflog_fband
    C1 = rand(X, 1, 1, nvector) .* X(20)
    C2 = randn(X, 1, 1, nvector) .* X(10) .- X(5)
    f = 1:nband
    t = 1:nframe
    spectrum = C1 .* cos.(pi .* X.(f) ./ X(nband)) .+ C2 .*
cos.(X(2) .* pi .* X.(f) ./ X(nband))
    spectrum = spectrum .- mean(spectrum; dims=1)
    part1 = sin.(X(2) .* pi .* (f .+ t' .* melody) ./ pitchiness)
    part2 = cos.(X(2) .* pi .* t' .* X(60 * 4) .* coef.dt_ms ./
(tempo_bpm[1]*X(1000)))
    spectrum .+ X(10) .* part1 .* part2
end
```

To improve the robustness of the training data, the multi-style training S109 may further comprise adding artificial pairs of features to the first and second sets of features, wherein an artificial pair of feature comprises a first feature added to the first set of features and a second feature added to the second set of features, the first and second feature having a same value and corresponding to a same frequency band.

The first and second sets of features (adjusted via processing and/or multi style training, or original) is then used for deriving a set of gains. This is done by comparing S110 each feature of the first set of features to a corresponding feature of the second set of features to derive a set of gains, each gain corresponding to a respective feature among the first set of features, and used as ground truth when training the MLM. The comparison comprises for each feature pair, subtracting the value of the feature of the first set of features from the value of the feature of the second set of features.

In some embodiments, over suppression in the trained MLM is reduced by defining S111 a loss function of the MLM that is configured to punish a predicted gain being lower than the ground truth gain more than a predicted gain being higher than the ground truth gain. This embodiment will now be described.

In some embodiments, the loss function is configured to punish a predicted gain being lower than the ground truth gain more than a predicted gain being higher than the ground truth gain by: multiplying a distance measurement between the predicted gain and the ground truth with a weight, the weight being relatively higher when:
the predicted gain is lower than the ground truth gain, and
the predicted gain is negative,
the weight being relatively lower when:
the predicted gain is higher than or equal to the ground truth gain, or
the predicted gain is positive.

The ratio between the relatively higher weight and the relatively lower weight may be between 3-7, for example 5.

In one embodiment, the equation for loss function is:

$$(a)\ \text{loss} = w * |y^{pre} - y^{true}|^2 + |y^{pre} - y^{true}|$$

$$(b)\ w_{i,j} = \begin{cases} a, & y_{i,j}^{pre} < y_{i,j}^{true} \text{ and } y_{i,j}^{pre} < 0 \\ 1, & y_{i,j}^{pre} \geq y_{i,j}^{true} \text{ or } y_{i,j}^{pre} \geq 0 \end{cases}$$

where i is a frame index; j is a band index; a is a punishment coefficient, which according to experiments, a=5, gets the best result, but other values may be used depending on the context and requirements, $y^{pre}$ is the predicted gain from the MLM and $y^{true}$ is the ground truth gain. Other suitable ways of defining the loss function where a predicted gain being lower than the ground truth gain is punished more than a predicted gain being higher than the ground truth may be used. For example, the weight w may be multiplied with the second term in a) or with the sum of both the first (L2) term and the second term.

In some embodiments, a further weight, z, is added to the equation, which weight depends on the frequency band j of the features of the training set, such that an error for a feature corresponding to a relatively higher frequency band is weighted with a relatively higher weight. The equation for the loss function may be $$(a)\ \text{loss} = z * w * |y^{pre} - y^{true}|^2 + |y^{pre} - y^{true}|$$

$$(b)\ w_{i,j} = \begin{cases} a, & y_{i,j}^{pre} < y_{i,j}^{true} \text{ and } y_{i,j}^{pre} < 0 \\ 1, & y_{i,j}^{pre} \geq y_{i,j}^{true} \text{ or } y_{i,j}^{pre} \geq 0 \end{cases}$$

$$(c)\ z_{i,j} = \begin{cases} \beta, & j => t \\ \mu, & j < t \end{cases}$$

where $\beta > \mu$.

For example, an error for a feature corresponding to a frequency band exceeding 6 kHz is weighted with a higher weight compared to an error for a feature corresponding to a frequency band below 6 kHz.

Other suitable ways of defining the loss function where an error for a feature corresponding to a relatively higher frequency band is weighted with a relatively higher weight may be used. For example, the weight w may be multiplied with the second term in a) or with the sum of both the first (L2) term and the second term.

Returning again to FIG. 1, the method 100 continues by using the first set of features and the derived set of gains as a training set for training the MLM.

As described above, the MLM may be a DNN. By way of example, an architecture of such a DNN will now be described. This architecture has proven to be advantageous for the task of training the MLM for the purpose described herein. The architecture of the DNN may be a typical feed-forward full-connected deep neural network. It may have one input layer, six hidden layers and one output layer. The architecture may be summarized as follows:

(1) Layer 1: input layer, number of DNN nodes is 320, include e.g. 8 frame band feature stacked together (as described above), 7 history frames and one current frame (9 history frames and one current frame, 15 history frames and one current frame, etc.,).

(2) Layer 2: hidden layer 1, number of DNN nodes is 320, activation function is LeakyReLU. Followed with batch normalization.

(3) Layer 3: hidden layer 2, number of DNN nodes is 320, activation function is LeakyReLU. Followed with batch normalization.
(4) Layer 4: hidden layer 3, number of DNN nodes is 160, activation function is LeakyReLU. Followed with batch normalization.
(5) Layer 5: hidden layer 4, number of DNN nodes is 160, activation function is LeakyReLU. Followed with batch normalization.
(6) Layer 6: hidden layer 5, number of DNN nodes is 80, activation function is LeakyReLU. Followed with batch normalization.
(7) Layer 7: hidden layer 6, number of DNN nodes is 80, activation function is LeakyReLU. Followed with batch normalization.
(8) Layer 8: output layer, number of DNN nodes is 80, activation function is LeakyReLU.

However, other layer structures, activation function, etc., may be employed.

By using first sets of features (and corresponding gains for the training) from more than one frame as input to the DNN (or other suitable MLM), the network gets more input data to work with. When using a trained DNN for enhancing degraded audio (described further below) in a real time scenario, it may be advantageous to use a current audio frame from the degraded audio signal along with e.g. 7 history frames (previous frames) to reduce the latency of the enhancing process.

Figure 3:
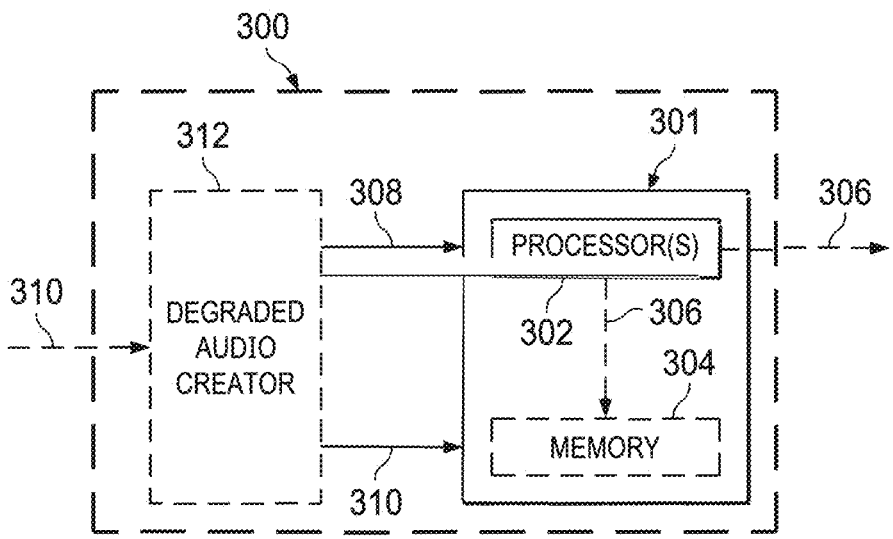
FIG. 3 shows a device configured for supervised training of a machine learning model, MLM, according to some embodiments.

As shown in FIG. 3, device 301 may store the trained MLM 306 in memory 304 for later use, or send data pertaining to the trained MLM 306 to a separate device to be used for enhancing a degraded audio signal.

Figure 4:
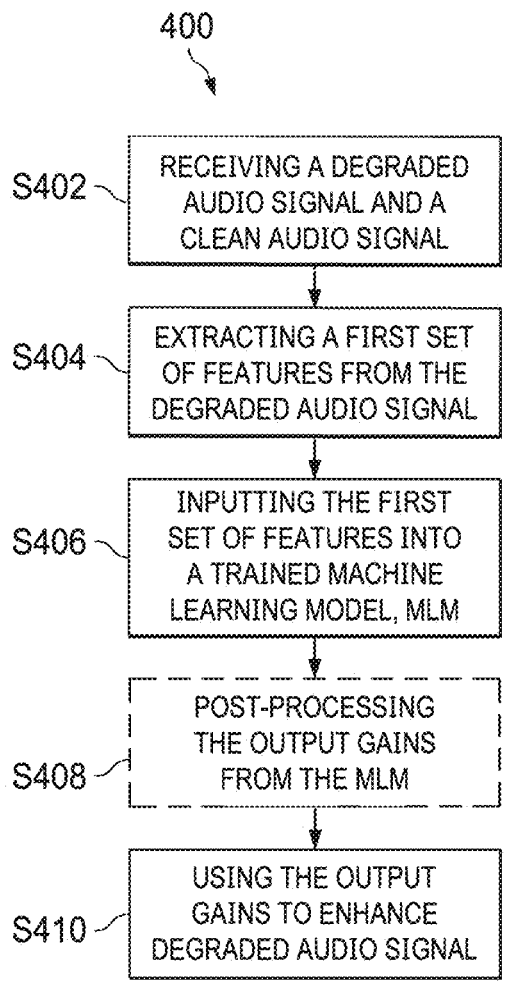
FIG. 4 shows a method for enhancing a degraded audio signal using the MLM trained as described in FIG. 1.
Figure 5:
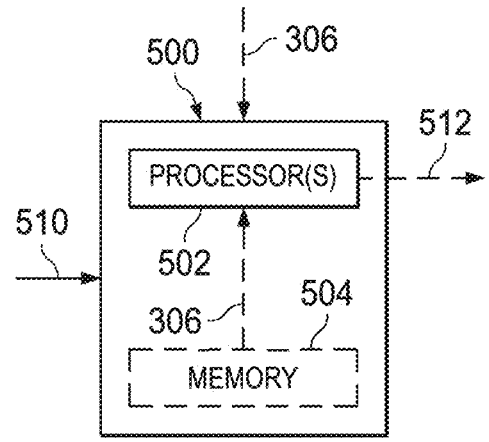
FIG. 5 shows a device configured for enhancing a degraded audio signal using the MLM trained as described in FIG. 1.

FIG. 4 shows a method 400 for enhancing a degraded audio signal which will be described in conjunction with FIG. 5 describing a device 500 comprising circuity 502 for performing the method 400. The method 400 comprising the steps of: receiving S402 a degraded audio signal 510; extracting S404 a first set of features from the received degraded audio signal; and inputting S406 the extracted first set of features to a machine learning model, MLM, 306 trained as described above. The trained MLM 306 may be received by the device by a wired or wireless transmission, or received from memory 504.

The method 400 continues by using S410 output gains from the trained MLM 306 for enhancing the received degraded audio signal 510.

The extracting S404 of the first set of features from the degraded audio signal 510 may be done as described above in conjunction with the training of the MLM. According to some embodiments, a zero mean and one variance normalization (normalize the first set of features to have zero mean and unit variance) is performed on the first set of features, which may make the MLM faster and easier to converge.

Optionally, a post-processing S410 of the output gains from the MLM may be employed. The post-processing may include limiting of gain range and gain decay control. Gain range limit is done to ensure that the output gain is in a reasonable range, which means that a degraded feature is not changed to much, which reduces the risk of unexpected errors. Gain decay control may be applied to keep the continuity of audio signal as enhanced. For this reason, the post-processing comprises at least one of:
limiting a range of the output gains to a predefined range;
limiting a difference between a gain for a frequency band of an audio frame of the received degraded audio signal and a gain for the frequency band of a previous audio frame of the received degraded audio signal,
limiting a difference between a gain for a frequency band of an audio frame of the received degraded audio signal and a gain for a neighbouring frequency band of the audio frame or another audio frame of the received degraded audio signal.

When receiving the output gains from the MLM, these may be applied S412 to the frequency representation of the input degraded audio signal according to the following.

First, the 10 power of the output gain is calculated to go from log gain to band gain. Then, a band inverse is performed to inverse band gain to gains relating to the frequency bins. Then the gains relating to frequency bins are multiplied with the corresponding part of the frequency domain representation of the degraded audio signal, i.e. the gains relating to frequency bins are multiplied with MDXT/MDCT/STFT complex feature to get enhanced MDXT/MDCT/STFT feature. Finally, MDXT/MDCT/STFT transform inverse is performed to go from the frequency domain to the time domain again, and the end result is an enhanced audio signal, 512.

According to some embodiments the degraded audio signal is a public switched telephone network, PSTN, call, wherein the steps of extracting a first set of features and inputting the extracted first set of features to the trained MLM is performed for at least one audio frame of the PSTN call. The device 500 may thus be used for enhancing audio quality of the PSTN call before a user hears the call. The device 500 may be adapted to handle offline recordings and/or enhancing audio signals in real time.

In some embodiments, the device 500 is part of an end point of an audio conference system and used for enhancing incoming audio signals (e.g. PSTN calls).

In some embodiments, the device 500 is part of an end point of a server of an audio conference system used for enhancing incoming audio signals (e.g. PSTN calls) before being transmitted to an end point.

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The systems and methods disclosed hereinabove may be implemented as software, firmware, hardware or a combination thereof. For example, aspects of the present application may be embodied, at least in part, in an apparatus, a system that includes more than one device, a method, a computer program product, etc. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by a computer. Further, it is well known to the skilled person that communication media typically embodies computer readable instructions, data structures, program modules or other data in a modulated data signal such as a carrier wave or other transport mechanism and includes any information delivery media.

Various aspects of the present invention may be appreciated from the following enumerated example embodiments (EEEs):

EEE1. A method for supervised training of a machine learning model, MLM, to enhance a degraded audio signal by calculating gains to be applied to frequency bands of the degraded audio signal, the method comprising the steps of:
  receiving a degraded audio signal and a clean audio signal for training of the MLM;
  extracting a first set of features from the received degraded audio signal, and a second set of features from the received clean audio signal, each feature corresponding to a frequency band of the respective received audio signals;
  comparing each feature of the first set of features to a corresponding feature of the second set of features to derive a set of gains, each gain corresponding to a respective feature among the first set of features, and used as ground truth when training the MLM;
  using the first set of features and the derived set of gains as a training set for training the MLM;
  wherein over suppression in the trained MLM is reduced by at least one of:
    a pre-processing step performed prior to deriving the set of gains, wherein the pre-processing step comprises adjusting the frequency energy distribution of the first and/or the second set of features such that the frequency energy distribution of the first set of features is substantially equal to the frequency energy distribution of the second set of features, and
    defining a loss function of the MLM which is configured to punish a predicted gain being lower than the ground truth gain more than a predicted gain being higher than the ground truth gain.

EEE2. A method according to EEE1, wherein over suppression is reduced using only one of the pre-processing step and the defined loss function of the MLM.

EEE3. A method according to EEE1, wherein over suppression is reduced using both the pre-processing step and the defined loss function of the MLM.

EEE4. A method according to any one of EEEs 1-3, wherein the loss function is further weighted according to the frequency band of the features of the training set, such that an error for a feature corresponding to a relatively higher frequency band is weighted with a relatively higher weight.

EEE5. A method according to EEE4, wherein an error for a feature corresponding to a frequency band exceeding 6 kHz is weighted with a higher weight compared to an error for a feature corresponding to a frequency band below 6 kHz.

EEE6. A method according to any one of EEEs 1-5, wherein the first and second sets of features are extracted by converting the received degraded audio signal and clean audio signal into the frequency domain.

EEE7. A method according to EEE6, wherein the conversion is performed using one from the list of: a short time Fourier transform, SFTF, a modified discrete cosine transform, MDCT, and a shifted discrete frequency transform, MDXT.

EEE8. A method according to EEE7, wherein the first and second set of features are extracted by, for each frequency band of a plurality of frequency bands,
  for frequency bins of the frequency band, combining complex features of the frequency domain representation of the respective audio signal corresponding to the frequency bins into a single feature corresponding to that frequency band.

EEE9. A method according to EEE8, wherein the features of the first and second set of features corresponds to Mel-frequency band powers, Bark Scale band powers, log-frequency band powers or ERB band powers.

EEE10. A method according to any one of EEEs 1-9, wherein the step of pre-processing comprises balancing a frequency energy distribution of the second set of features to be substantially equally distributed across the entire frequency band of the received clean audio signal.

EEE11. A method according to EEE10, wherein the pre-processing comprises:
  fitting a polynomial curve to the second set of features,
  defining a filter based on a difference between the polynomial curve and a constant function,
  applying the filter to the second set of features.

EEE12. A method according to EEE10, wherein the pre-processing comprises:
  fitting a polynomial curve to the second set of features,
  calculating a difference between a minimum value and a maximum value of the polynomial curve,
  upon determining that the difference exceeds a threshold value:
    defining a filter based on the difference between the polynomial curve and a constant function,
    applying the filter to the second set of features.

EEE13. A method according to EEE12, wherein the threshold value corresponds to a 3 dB difference in a frequency energy distribution of the second set of features across the entire frequency band of the received clean audio signal.

EEE14. A method according to any one of EEEs 11-13, wherein a value of the constant function is set to the maximum value of the polynomial curve.

EEE15. A method according to any one of EEEs 11-14, wherein the polynomial curve is one from the list of: a linear curve, a quadratic curve and a cubic curve.

EEE16. A method according to any one of EEEs 1-15, wherein the loss function is configured to punish a predicted gain being lower than the ground truth gain more than a predicted gain being higher than the ground truth gain by:
multiplying a distance measurement between the predicted gain and the ground truth with a weight, the weight being relatively higher when:
the predicted gain is lower than the ground truth gain, and
the predicted gain is negative,
the weight being relatively lower when:
the predicted gain is higher than or equal to the ground truth gain, or
the predicted gain is positive.

EEE17. A method according to EEE16, wherein the ratio between the relatively higher weight and the relatively lower weight is between 3-7.

EEE18. A method according to EEE17, wherein the ratio between the relatively higher weight and the relatively lower weight is 5.

EEE19. A method according to any one of EEEs 1-18, wherein the first and second sets of features are extracted by:
converting the received degraded audio signal and clean audio signal into the frequency domain,
for each frequency band, j, of a plurality of frequency bands
combining frequency components of the frequency domain representation of the degraded audio signal into a feature, $f_{1,j}$, corresponding to the frequency band, and adding $\log(f_{1,j})$ to the first set of features;
combining frequency components of the frequency domain representation of the clean audio signal into a feature, $f_{2,j}$, corresponding to the frequency band and adding $\log(f_{2,j})$ to the to the second set of features.

EEE20. The method of EEE19, wherein the steps of combining frequency components of the frequency domain representation of the degraded audio signal into a feature, $f_{1,j}$, comprises weighting the frequency components with different weights, wherein the steps of combining frequency components of the frequency domain representation of the clean audio signal into a feature, f2, j, comprises weighting the frequency components with said different weights.

EEE21. The method of any one of EEEs 19-20, wherein the plurality of frequency bands are equally spaced in Mel frequency.

EEE22. The method of EEE21, wherein the first and second set of features are extracted by combining extracted features from a plurality of audio frames of the respective audio signals.

EEE23. The method of EEE22, wherein the extracted first and second set of features are further normalized prior to being used for deriving the set of gains.

EEE24. The method of any one of EEEs 1-23, further comprising adding artificial pairs of features to the first and second sets of features, wherein an artificial pair of feature comprises a first feature added to the first set of features and a second feature added to the second set of features, the first and second feature having a same value and corresponding to a same frequency band.

EEE25. The method of any one of EEEs 1-24, further comprising the step of, before comparing each feature of the first set of features to a corresponding feature of the second set of features to derive a set of gains, adding noise to the first set of features.

EEE26. The method of EEE25, wherein the noise is added only for a first threshold number of epochs when training the MLM.

EEE27. The method of any one of EEEs 1-24, further comprising the step of, before comparing each feature of the first set of features to a corresponding feature of the second set of features to derive a set of gains, adjusting the first and/or the second set of features, wherein the adjustment comprises using distinct adjustment parameters during each training pass, epoch and/or minibatch of a training loop of the MLM.

EEE28. The method of EEE27, wherein the adjustment parameters are drawn from a plurality of probability distributions.

EEE29. The method of any one of EEEs 27-28, wherein the adjusting of the first set of features comprises at least one from the list of: adding fixed spectrum stationary noise, adding variable spectrum stationary noise, adding reverberation, adding non-stationary noise, adding simulated echo residuals, simulating microphone equalization, simulating microphone cut-off, and varying broadband level.

EEE30. A method according to any one of EEEs 1-29, wherein the received degraded audio signal is generated from the received clean audio signal.

EEE31. A method according to EEE30, wherein generation of the degraded audio signal comprises applying at least one codec to the clean audio signal.

EEE32. A method according to EEE31, wherein the at least one codec comprises a voice codec.

EEE33. A method according to any one of EEEs 30-32, wherein generation of the degraded audio signal comprises applying an Intermediate Reference System, IRS, filter to the clean audio signal.

EEE34. A method according to any one of EEEs 30-33, wherein generation of the degraded audio signal comprises applying a low pass filter to the clean audio signal.

EEE35. A method according to any one of EEEs 30-34, wherein generation of the degraded audio signal comprises convolving a generated degraded audio signal with a narrow band impulse response.

EEE36. A method according to any one any one of EEEs 1-35, wherein the MLM is one from a list of: an artificial neural network, a decision tree, a support vector machine, a mixture model, and a Bayesian network.

EEE37. A method for enhancing a degraded audio signal, comprising the steps of:
receiving a degraded audio signal;
extracting a first set of features from the received degraded audio signal;
inputting the extracted first set of features to a machine learning model, MLM, trained according to any one of EEEs 1-36; and
using output gains from the MLM for enhancing the received degraded audio signal.

EEE38. A method according to EEE37, further comprising the step of post-processing the output gains before using the gains for reducing coding artefacts of the received degraded audio signal.

EEE39. A method according to EEE38, wherein the post-processing comprises at least one of:
limiting a range of the output gains to a predefined range, limiting a difference between a gain for a frequency band of an audio frame of the received degraded audio signal and a gain for the frequency band of a previous audio frame of the received degraded audio signal, and limiting a difference between a gain for a frequency band of an audio frame of the received degraded audio signal and a gain for a neighbouring frequency band of the audio frame or another audio frame of the received degraded audio signal.

EEE40. A method according to any one of EEEs 37-39, wherein the degraded audio signal is a public switched telephone network, PSTN, call, wherein the steps of extracting a first set of features and inputting the extracted first set of features to the trained MLM is performed for at least one audio frame of the PSTN call.

EEE41. A method according to any one of EEEs 37-40, implemented in an end point of an audio conference system for enhancing incoming audio signals.

EEE42. A method according to any one of EEEs 37-41, implemented in a server of an audio conference system for enhancing incoming audio signals before being transmitted to an end point.

EEE43. A device configured for supervised training of a machine learning model, MLM, to enhance a degraded audio signal by calculating gains to be applied to frequency bands of the degraded audio signal, the device comprising circuity configure to:

receive a degraded audio signal and a clean audio signal for training of the MLM;

extract a first set of features from the received degraded audio signal, and a second set of features from the received clean audio signal, each feature corresponding to a frequency band of the respective received audio signals;

compare each feature of the first set of features to a corresponding feature of the second set of features to derive a set of gains, each gain corresponding to a respective feature among the first set of features, and used as ground truth when training the MLM;

use the first set of features and the derived set of gains as a training set for training the MLM;

wherein over suppression in the trained SMLM is reduced by at least one of:

prior to deriving the set of gains, performing pre-processing comprising adjusting the frequency energy distribution of the first and/or the second set of features such that the frequency energy distribution of the first set of features is substantially equal to the frequency energy distribution of the second set of features, and defining a loss function of the MLM configured to punish a predicted gain being lower than the ground truth gain more than a predicted gain being higher than the ground truth gain.

EEE44. A device configured for enhancing a degraded audio signal, the device comprising circuity configure to:

receive a degraded audio signal;

extract a first set of features from the received degraded audio signal;

input the extracted first set of features to a machine learning model, MLM, trained according to any one of EEEs 1-36; and use output gains from the MLM for enhancing the received degraded audio signal.

EEE45. A computer program product comprising a non-transitory computer-readable storage medium with instructions adapted to carry out the method of any one of EEEs 1-36 when executed by a device having processing capability.

EEE46. A computer program product comprising a non-transitory computer-readable storage medium with instructions adapted to carry out the method of any one of EEE37-EEE42 when executed by a device having processing capability.

The invention claimed is:

1. A method for enhancing a degraded audio signal, the method comprising:

receiving the degraded audio signal;

extracting a first set of features from the received degraded audio signal;

inputting the extracted first set of features to a machine learning model to produce output gains, wherein the machine learning model is trained using a loss function defined to penalize a predicted gain being lower than a ground truth gain more than the predicted gain being higher than the ground truth gain; and enhancing the received degraded audio signal using the output gains from the machine learning model.

2. The method of claim 1, wherein the machine learning model comprises at least one of an artificial neural network, a decision tree, a support vector machine, a mixture model, a Bayesian network, a deep neural network, a shallow neural network, and/or a convolutional neural network.

3. The method of claim 1, wherein the enhancing the received degraded audio signal using the output gains comprises reducing coding artefacts of the received degraded audio signal.

4. The method of claim 1, wherein enhancing the received degraded audio signal using the output gains occurs in real-time.

5. The method of claim 1, wherein extracting the first set of features from the received degraded audio signal comprises:

converting the degraded audio signal into a frequency domain audio signal; and determining the first set of features from the frequency domain audio signal.

6. The method of claim 5, wherein the frequency domain audio signal comprises at least one of a short time Fourier transform, a modified discrete cosine transform, and/or a shifted discrete frequency transform.

7. The method of claim 1, where the extracted first set of features correspond to at least one of Mel-frequency band powers, Bark Scale band powers, log-frequency band powers, and/or ERB band powers.

8. The method of claim 1, further comprising:

normalizing the extracted first set of features prior to inputting said first set of features to the machine learning model.

9. The method of claim 8, wherein the normalizing comprises performing a zero mean and one variance normalization on the extracted first set of features.

10. The method of claim 1, further comprising post-processing the output gains from the machine learning model prior to enhancing the received degraded audio signal.

11. A machine learning-based system for enhancing a degraded audio signal, the system comprising:
a processor comprising a machine learning model, wherein the processor is configured to:
receive a degraded audio signal;
extract a first set of features from the degraded audio signal;
input the extracted first set of features to the machine learning model, wherein the machine learning model is trained using a loss function defined to penalize a predicted gain being lower than a ground truth gain more than the predicted gain being higher than the ground truth gain;
receive, as output from machine learning model, output gains; and
enhance the received degraded audio signal using the output gains.

12. The system of claim 11, wherein the machine learning model comprises at least one of an artificial neural network, a decision tree, a support vector machine, a mixture model, a Bayesian network, a deep neural network, a shallow neural network, and/or a convolutional neural network.

13. The system of claim 11, wherein the machine learning model comprises a deep neural network.

14. The system of claim 13, wherein the deep neural network comprises:
an input layer;
one or more hidden layers; and
an output layer.

15. The system of claim 14, wherein the input layer is configured to take, as input, the extracted first set of features, wherein the one or more hidden layers are configured to process the extracted first set of features, and wherein the output layer is configured to output the output gains based on the processed, extracted first set of features.

16. The system of claim 11, wherein the processor is configured to enhance the received degraded audio signal in real-time.

17. The system of claim 11, wherein the processor is configured to reduce coding artefacts of the received degraded audio signal.

* * * * *